(12) United States Patent
Veazey et al.

(10) Patent No.: US 6,526,504 B1
(45) Date of Patent: Feb. 25, 2003

(54) SYSTEM AND METHOD FOR SIZING COMPUTER SYSTEMS WITH VARIABLE RAMP-UP PERIODS BY CALCULATING A THROUGHPUT FOR TARGET CONFIGURATION BASED ON DATA OBTAINED FROM A COMPUTER SUBSYSTEM

(75) Inventors: Judson Veazey, Fort Collins, CO (US); Russell O. Craig, Fort Collins, CO (US); Dennis L. M. Clark, Ft. Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/442,654

(22) Filed: Nov. 18, 1999

(51) Int. Cl.[7] .............................................. G06F 15/177
(52) U.S. Cl. ......................... 713/1; 713/100; 709/220; 709/221; 370/229; 370/232
(58) Field of Search ...................... 713/1, 100; 709/220, 709/221, 222; 370/229, 232, 252

(56) References Cited

U.S. PATENT DOCUMENTS 5,886,907 A * 3/1999 Abu-Amara et al. ........ 370/232
5,886,984 A * 3/1999 Abu-Amara et al. ........ 370/252
5,914,945 A * 6/1999 Abu-Amara et al. ........ 370/329
6,067,287 A * 5/2000 Chung-Ju et al. ........... 370/232
6,067,412 A * 5/2000 Blake et al. ................ 709/101

OTHER PUBLICATIONS

Lazowska, Edward D., et al. "Quantitative System Performance: Computer System Analysis Using Queueing Network Models", Part I, pp. 1–69, 1984 Prentice-Hall, Englewood Cliffs, New Jersey.

* cited by examiner

Primary Examiner—Thomas Lee
Assistant Examiner—Thuan Du

(57) ABSTRACT

The present invention provides a system and method for accurately sizing a computer system and its component subsystems. The present invention requires only limited benchmark analysis to design varying subsystem configurations, having varying numbers of users, and accounting for varying ramp-up periods. Moreover, the severe undersizing and oversizing errors inherent in previous systems are avoided without requiring repeated trial and error benchmark trials.

20 Claims, 5 Drawing Sheets

SYSTEM AND METHOD FOR SIZING COMPUTER SYSTEMS WITH VARIABLE RAMP-UP PERIODS BY CALCULATING A THROUGHPUT FOR TARGET CONFIGURATION BASED ON DATA OBTAINED FROM A COMPUTER SUBSYSTEM

FIELD OF THE INVENTION

The present invention relates to the design, evaluation, and sizing of computer systems.

BACKGROUND OF THE INVENTION

The performance of a computer system in executing a particular application is determined by the complex interactions of its component parts. An application is a set of instructions executed in a particular sequence (but not always the same sequence), referencing data in a variable pattern. The particular hardware on which the application runs provides a variety of components that the application accesses in variable and complex manners to form the whole system.

Therefore, in order to evaluate the performance of a computer system as a whole, designers typically focus on individual subsystems independently, understanding the performance of each subsystem and then evaluating its interactions with other subsystems. Any one subsystem that is receiving excessive use can cause a bottleneck for the entire computer system, thereby creating unacceptable user response times. Accordingly, the goal of computer system design and sizing is to create a computer system whereby all of the individual subsystems meet or exceed the capacity necessary to provide acceptable user response times. General categories of computer subsystems include: processor/cache; memory; input/output ("I/O"); operating system data structures; networking; etc.

The necessary subsystem capacity for a particular application has typically been determined based on empirical data derived from observing steady-state behavior of the system. Steady state refers to when the computer system has generally reached equilibrium in terms of the number of application users. Computer systems, however, do not always operate at steady state. Rather, computer systems must first "ramp-up" to a steady-state number of users. For example, the computer system at a bank may host a thousand users during the majority of the working day, but the number of users may increase from zero to one thousand from 8:00 a.m. to 8:30 a.m., as employees arrive for work. The period between zero (or low) usage to steady-state usage is referred to as the "ramp-up" period.

Sizing computer systems based on only steady-state information can result in serious errors because it is based on the assumption that the maximum utilization for the computer system (and its individual subsystems) occurs during steady-state operation. That assumption is correct only if the per-user utilization of the computer system is the same or less than utilization during steady-state operation. For many applications, however, per-user utilization of the computer system (and/or individual subsystems) is greater during ramp-up than during steady-state operation.

For example, as shown in FIG. 1, the I/O queue length (number of instructions waiting to be executed by the I/O subsystem), increases exponentially during ramp-up for many applications. This phenomenon is caused by increased I/O activity per user when users first activate an application (e.g., when users first access a web browser, significant I/O activity is created because the application must download outside libraries, specific data structures, etc.). As shown in FIG. 1, the increase in per user I/O activity causes the peak utilization of the I/O subsystem to occur during ramp-up 100, not during steady-state operation 110. Accordingly, an I/O subsystem sized for steady-state operation will cause unacceptable customer response times during ramp-up due to an I/O bottleneck.

This problem is often ignored by salespeople and engineers charged with designing a custom computer system for a particular application, thereby resulting in computer systems that are undersized and perform poorly during ramp-up. Alternatively, those computer system designers who have become aware of the problem will sometimes use a "fudge factor" to estimate the additional system capacity necessary during ramp-up for certain applications. For example, some system designers will configure a system based on steady-state data and then increase the capacity of particular subsystems by 50% to account for increased utilization during ramp-up. This "fudge factor" method, of course, can be extremely inaccurate—often resulting in oversized computer systems that are a waste of the customer's money or undersized computer systems that perform poorly during ramp-up.

No method or system for accurately compensating for increased utilization during ramp-up has previously been developed. The reasons for this are apparent—time and money. Computer systems (and subsystems) have typically been sized based on empirical data derived for a particular configuration running a particular application. That empirical data is derived using a benchmark analysis, wherein the application is run (or modeled by computer simulation) for each potential configuration assuming a certain number of users during steady-state operation. For example, in order to determine the steady-state I/O utilization in a certain configuration for a particular application, a system designer performs a benchmark analysis. The benchmark analysis indicates the amount of I/O activity per user during steady state (i.e., (I/O activity during steady-state)÷(number of users in benchmark analysis)). The steady-state I/O requirements for a different number of users than used in the benchmark analysis can then be calculated linearly for each configuration (i.e., (I/O activity per user)×(number of users)).

Taking into account the ramp-up period makes this empirical approach much more difficult because, as discussed, per-user utilization is often different during ramp-up than during steady-state. That fact makes a linear extrapolation from a single calculation of per-user utilization impossible. Moreover, different customers have varying ramp-up periods, which can also significantly affect per-user utilization of system resources. In general, shorter ramp-up periods cause certain subsystem queue lengths to grow more rapidly. Accordingly, in order to size a computer system accurately using the typical benchmark-analysis approach, one would need to test, for each application, all possible ramp-up periods against all possible system (and subsystem) configurations using varying numbers of users. The resulting test matrix would be immense and impractical, especially considering that benchmark analyses often take hours to run.

Perhaps for this reason, ramp-up periods have often been ignored in computer-system sizing. However, ramp-up can significantly affect a customer's perception of the system's performance. Accordingly, what is needed is a system and method for accurately sizing computer systems that does not require massive numbers of benchmark analyses and avoids the severe undersizing and oversizing errors inherent in the previous systems.

SUMMARY OF THE INVENTION

The present invention provides a system and method for accurately sizing a computer system and its component subsystems. The present invention requires only limited benchmark analysis to design varying configurations, having varying numbers of users, and accounting for varying ramp-up periods. In addition, the the severe undersizing and oversizing errors of previous systems are avoided without requiring repeated trial and error benchmark analyses.

According to a preferred embodiment of the present invention, diagnostic data for a known subsystem configuration B is derived from a single benchmark analysis. From that diagnostic data a "terminal queue length," $Q_{BL}$, for configuration B can be derived. Terminal queue length, as used herein, refers to the maximum subsystem queue length that can be permitted during ramp-up, beyond which application-user response time is unacceptable. Once $Q_{BL}$ is empirically determined from the diagnostic data, it can be used to determine, without further benchmark analysis, the necessary throughput for a "target configuration," A. Target configuration A is the subsystem configuration being sized and can be designed for a different number of users and/or a different ramp-up period than configuration B.

The basic method of the present invention requires: (1) obtaining empirically derived diagnostic data for a known configuration, B, of a computer subsystem, the configuration B accommodating a number of users, $N_B$, and a ramp-up period, $R_B$; (2) calculating, based on the diagnostic data for known configuration, B, the necessary throughput for target configuration, A, the target configuration A accommodating a number of users, $N_A$, and a ramp-up period, $R_A$, and providing an acceptable application-user response time during $R_A$; and (3) configuring the target configuration A.

The basic system of the present invention includes: a storage device and a processor operatively connected to the storage device, wherein: (1) the storage device: (a) stores a program for controlling the processor; and (b) receives empirically derived diagnostic data for a known configuration, B, of a computer subsystem, the configuration B accommodating a number of users, $N_B$, and a ramp-up period, $R_B$; and (2) the processor is operative with the program to: (a) calculate, based on the diagnostic data for known configuration, B, the necessary throughput for target configuration, A, of the computer subsystem, the target configuration A accommodating a number of users, $N_A$, and a ramp-up period, $R_A$ and providing an acceptable application-user response time during $R_A$; and (b) configure the target configuration A.

The invention is described in greater detail with regard to the following drawings.

DETAILED DESCRIPTION OF THE INVENTION

Figure 1:
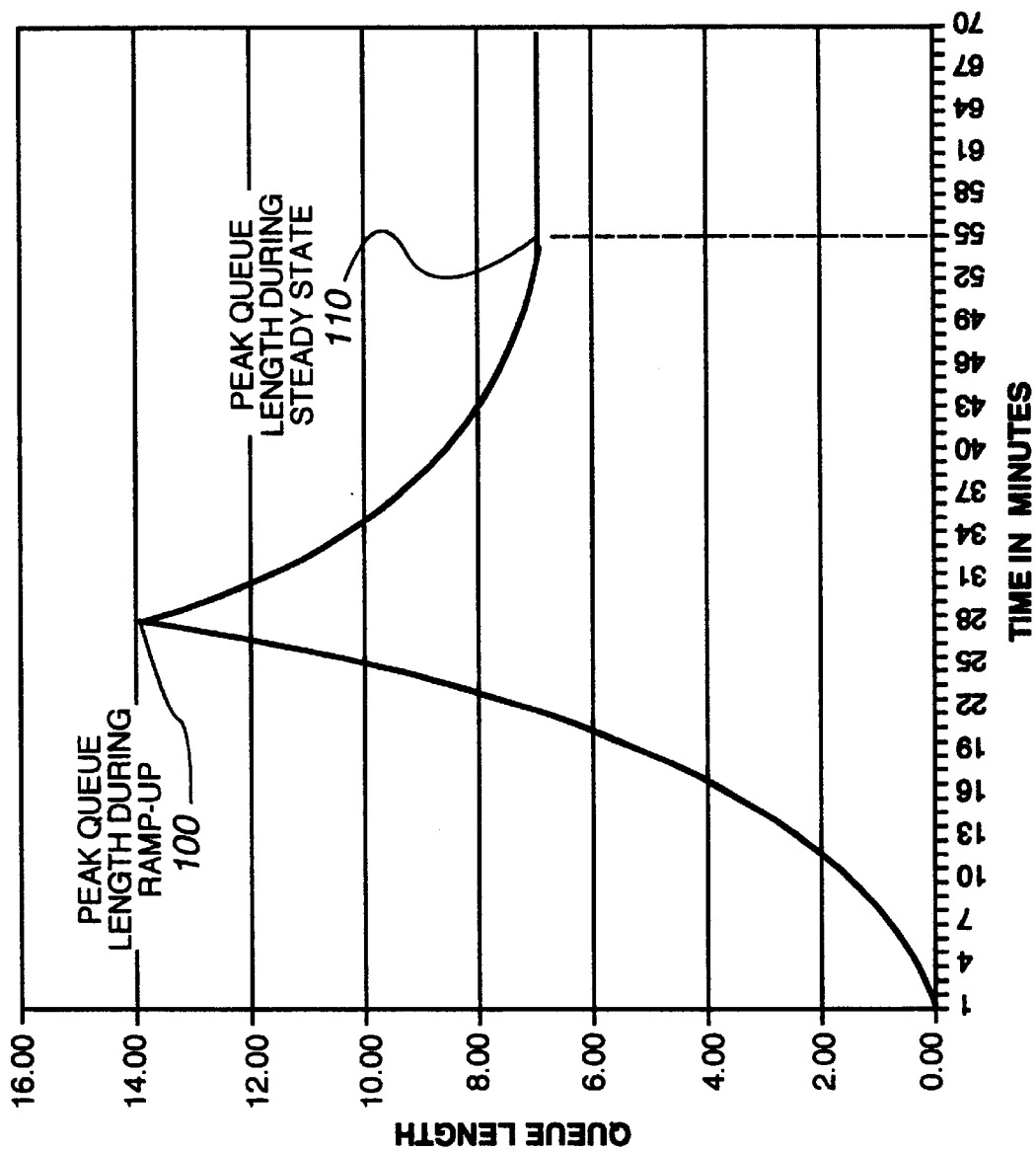
FIG. 1 is an exemplary graph illustrating the approximate change in queue length over time for a particular I/O subsystem configuration running a particular application.
Figure 2:
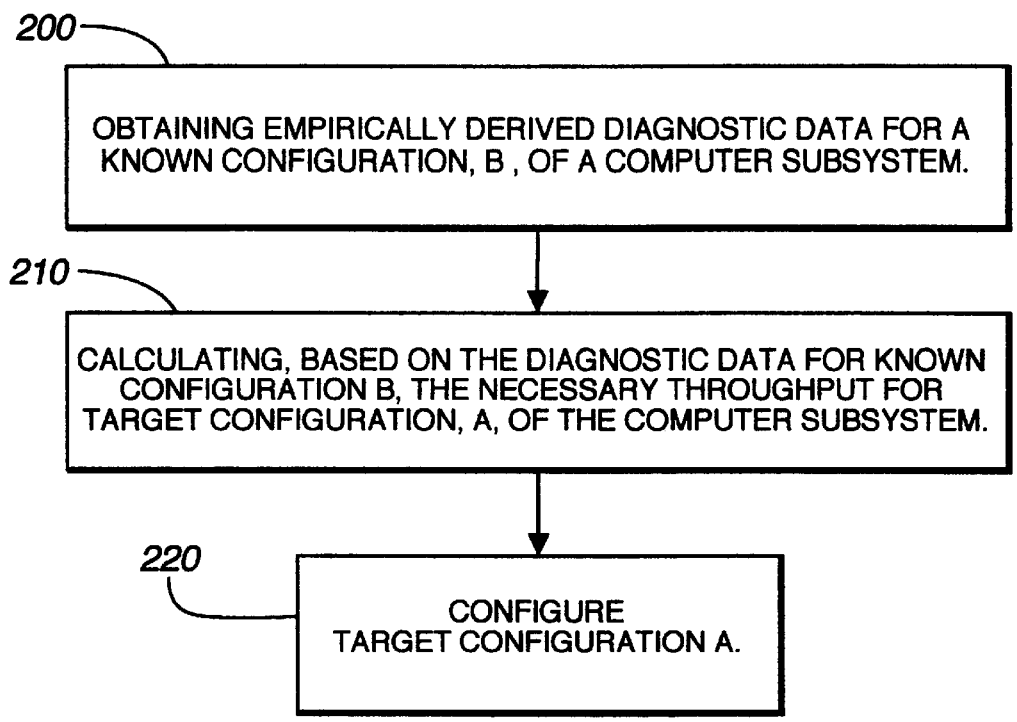
FIG. 2 is a flow chart of the basic method steps of the present invention.

The method and system of the present invention eliminates the errors and wasted empirical efforts of previous systems by extrapolating from limited benchmark analysis to correctly size computer systems and subsystems. FIG. 2 illustrates the basic method steps of the present invention. First, empirically derived diagnostic data for a known computer subsystem configuration is obtained 200, such as through a benchmark analysis. As used herein, configuration "B" refers to a known computer subsystem configuration that has been, or is being, subjected to a benchmark analysis for a particular application. In performing the benchmark analysis, the number of users at the end of ramp-up is presumed to equal $N_B$, and the ramp-up period for the application being tested on configuration B is referred to as $RP_B$.

Next, the diagnostic data from configuration B is used to calculate 210 the necessary throughput for target configuration, A. As used herein, target configuration A refers to the subsystem configuration that is being designed using the present method and system. In general, a subsystem configuration can be represented by its maximum throughput capability. For example, the configuration of an I/O subsystem can be represented by the maximum number of transactions (e.g., reads, writes, etc.) per second that it can accomplish. The present invention is intended to aid in accurately determining that throughput, although it is recognized that a number of particular combinations of subsystem elements (e.g., disk drives) can be used to achieve any particular maximum throughput capability.

Once the necessary throughput for target configuration A is calculated 210, target configuration A is designed 220. Again, the actual design 220 of target configuration A involves matters of design choice that can be affected by a variety of factors. For example, if a salesperson is using the present invention as a sizing tool, he is likely to suggest a combination of subsystem elements that he sells to achieve the necessary throughput of target configuration A. The combination of components to achieve the correct throughput can be automated by any number of known methods and systems. The present invention, however, facilitates calculation of the throughput requirement that makes an accurate design possible, whether or not the final design process is automated.

Figure 3:
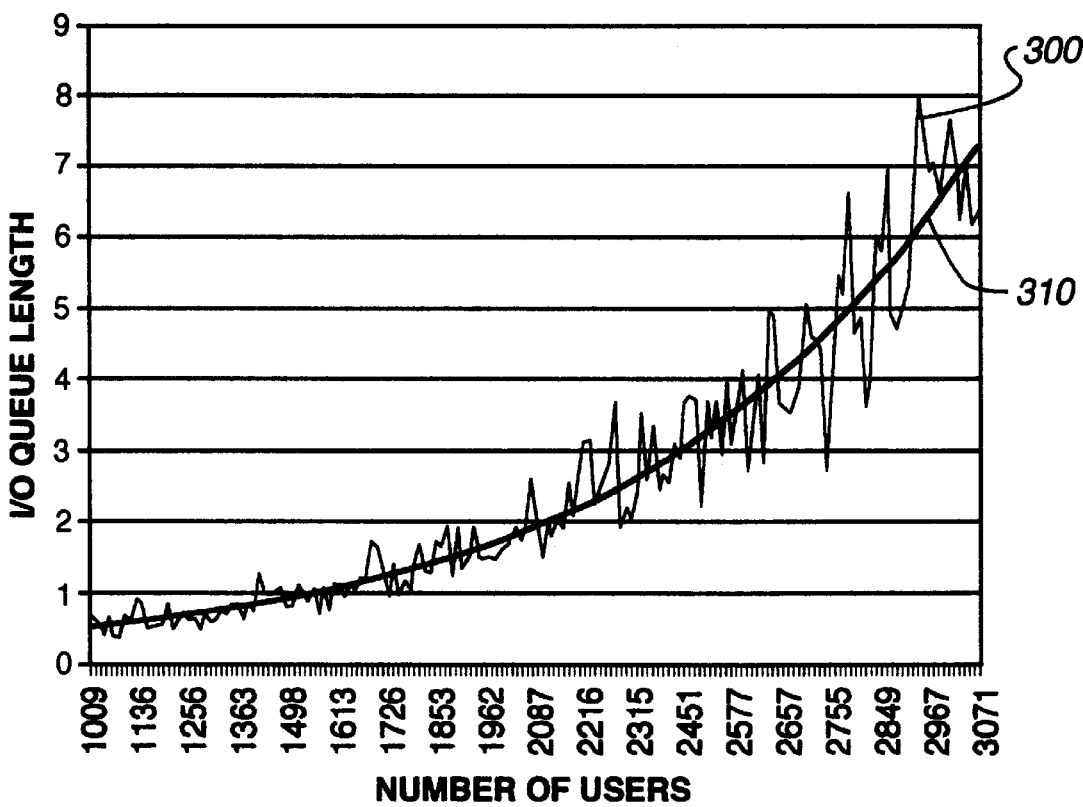
FIG. 3 is an exemplary graph illustrating the approximate change in queue length versus number of users during the ramp-up period of a particular I/O subsystem configuration running a particular application.

Preferred embodiments of the present invention are described in greater detail with regard to FIGS. 3–7. Subsystem queue length, which refers to the number of transactions waiting at any one time to be executed by the subsystem, is a good indicator of whether a subsystem is creating a bottleneck in the overall computer system. FIG. 3, for example, details a typical increase in I/O queue length as users are added during ramp-up. The raw data (shown by the jagged line 300) are well approximated by the exponential line 310. This is a common pattern among applications that are I/O bound during ramp-up. For the purposes of the present invention, ramp-up is generally presumed to result in an exponential increase in queue length for certain subsystems, such as the I/O subsystem. Indeed, for some applications, if the I/O subsystem is undersized, the computer system as a whole can become unstable during ramp-up.

As discussed, there is, for a given application and a given configuration, a maximum subsystem queue length that can be achieved during ramp-up, beyond which user response time is unacceptable. This is referred to herein as the "terminal queue length," and it varies from configuration to configuration depending on throughput. Configurations with higher throughput can accommodate a longer queue before response times become unacceptable. For example, a configuration with a throughput of 1,000 transactions per second will generally have a terminal queue length that is twice as long as a configuration that can perform only 500 transactions per second.

Figure 4:
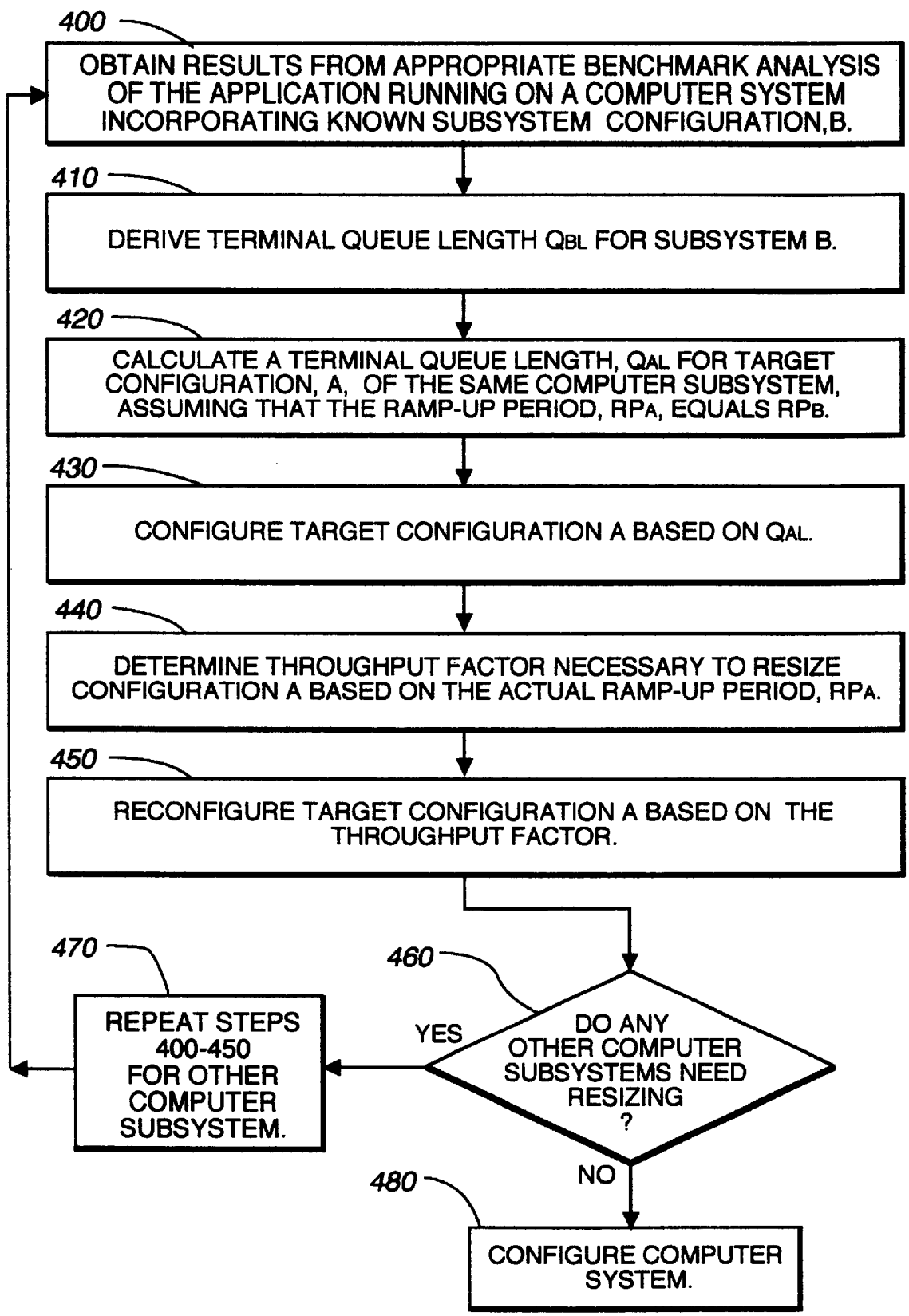
FIG. 4 is a flow chart of a preferred embodiment of the method according to the present invention.

As detailed in FIG. 4, the preferred embodiment of the present invention generally uses the empirically derived terminal queue length, $Q_{BL}$, of a known subsystem configuration B to accurately design target configuration A. As discussed, "terminal queue length," as used herein, refers to the maximum subsystem queue length that can be permitted during ramp-up, beyond which application-user response time is unacceptable. Acceptable application-user response times will vary depending on the application at issue and its users. For example, some complicated CAD-CAM applications may involve very long user response times; however, because those response times are expected, they are acceptable to the users. On the other hand, a user of word processing system typically will not accept response times that exceed a few seconds. Consequently, as used herein, "acceptable application-user response time" means whatever response time that is acceptable to the users of the application at issue. One of ordinary skill will recognize that acceptable application-user response times vary but can be determined on an ad hoc basis depending on the application, type of users, user expectations, etc. Often, the application-user response time will be dictated by the customer for whom the computer system is being designed.

Typically, computer systems are designed to accommodate a known number of steady-state users operating a particular application. The first step in the preferred method is to obtain 400 results from an appropriate benchmark analysis. A benchmark analysis for a particular application need not be performed each time a new computer system is to be configured. Rather, it is anticipated that benchmark data for particular applications will be stored to permit repeated use in sizing and resizing computer systems for those applications.

However, because the present invention concentrates on sizing individual subsystems within an overall computer system, choosing the appropriate benchmark analysis involves first determining the subsystem to be analyzed. The subsystem of interest is the one likely to create a system bottleneck during ramp-up, and it can be identified using a variety of known techniques, including analysis of previous benchmark runs for the same application. For example, the present invention can be used to right-size I/O subsystems in overall computer systems that are I/O bound during ramp-up.

It is preferred that the benchmarked computer system resemble as closely as possible the system being designed to minimize the effect of variations in other parts of the computer system on the performance of the subsystem of interest. For example, if it is determined that a computer system is I/O bound during ramp-up for a particular application, it is preferred that the benchmarked computer system be identical to the system being designed in all respects except for the I/O subsystem (which is being right-sized).

The benchmark analysis of subsystem configuration B includes data collected during ramp-up. Numerous system-monitoring utilities can be used to perform the benchmark analysis of subsystem configuration B, including "Perfmon" in Microsoft's Windows NT operating system. Many of those same utilities, including Perfmon, can be used to derive 410 specific parameters for subsystem configuration B, including the terminal queue length, $Q_{BL}$. As discussed, $Q_{BL}$ is the maximum queue length for subsystem configuration B that can exist before application-user response times become unacceptable.

In addition to $Q_{BL}$, the following information can be derived from the benchmark analysis of subsystem configuration B:

$N_B$ Number of users at end of ramp-up, configuration B.
$R_B$ Residence time, configuration B.
$S_B$ Service time, configuration B.
$X_B$ Throughput, configuration B.
$Q_{BT}$ Time in queue, configuration B.
$RP_B$ Ramp-up period, configuration B.

Many of these abbreviations and some of the basic queuing network theories discussed below are derived from "Quantitative System Performance: Computer System Analysis Using Queueing Network Models," by Lazowska, Zahorjan, Graham and Sevcik; Part I; Prentice-Hall, 1984, which is hereby incorporated by reference.

According to a preferred embodiment of the present invention, the empirical data from configuration B can be used to design, without further empirical analysis, a target subsystem configuration, A, having a different number of users and a different ramp-up period from configuration B. As used herein, the corresponding parameters for target configuration A are referred to as follows:

$N_A$ Number of users at end of ramp-up, configuration A.
$R_A$ Residence time, configuration A.
$S_A$ Service time, configuration A.
$X_A$ Throughput, configuration A.
$Q_{AT}$ Time in queue, configuration A.
$Q_{AL}$ Terminal queue length, configuration A.
$RP_A$ Ramp-up period, configuration A.

Both $N_A$ and $RP_A$ may (and usually will) differ from $N_B$ and $RP_B$, respectively. However, according to the present invention, these two variables are addressed separately. First, terminal queue length, $Q_{AL}$, is calculated 420, assuming that the ramp-up period $RP_A$ equals $RP_B$ (i.e., the ramp-up period is held constant while the number of users is permitted to vary between known configuration B and target configuration A). Configuration A is then configured 430 based on $Q_{AL}$. Next, a throughput factor is calculated to compensate for any difference between $RP_A$ and $RP_B$, and target configuration A is reconfigured 450 based on the throughput factor. Once subsystem configuration A is correctly sized for both $N_A$ and $RP_A$, each of the other computer subsystems are checked 460 to determine whether it needs resizing. If so, steps 400 through 450 are repeated 470 for that different subsystem. Finally, the computer system as a whole is configured 480.

Calculation of $Q_{AL}$

The calculation 420 of $Q_{AL}$ can be accomplished as follows. $Q_{BL}$, $N_A$, and $N_B$ are known. In addition, it is assumed that the overall computer system incorporating target configuration A will have the same response time as the computer system used to benchmark subsystem configuration B. This implies that each of subsystem configurations A and B has the same residence time:

$$R_A = R_B \quad [0]$$

In addition, Little's Law indicates that:

$$R = N/X$$

so $$N_A/X_A = N_B/X_B. \quad [1]$$

In addition, it is known that:

$$S_k = B_k/C_k = U_k T/C_k = U_k/Xk$$

where k refers to a particular service center (for example, the I/O subsystem), B is the time busy, C is the number of completions, T is the observation interval, and U is the utilization. It can be assumed here that the $U_A = U_B = 1$ (i.e., that the I/O subsystem is fully utilized during the times of interest). Otherwise, the queue length would not increase exponentially during ramp-up. Thus:

$$S_A = 1/X_A$$

$$S_B = 1/X_B,$$

which implies that $$S_A/S_B = X_B/X_A \quad [2]$$

and $$S_A/S_B = N_B/N_A. \quad [3]$$

(by equation [1] above).
Given that time in queue is denoted as $Q_{AT}$ and $Q_{BT}$ for A and B, respectively:

$$R_B = Q_{BT} + S_B \quad [4]$$

(i.e., residence time equals time in queue plus service time). In addition, $$Q_{BT} = Q_{BL} * S_B. \quad [4a]$$

$Q_{BL}$ is known, and $S_B$ can be arbitrarily assigned a value of 1 because, for these purposes, it is unitless. Therefore:

$$Q_{BT} = Q_{BL}. \quad [5]$$

Then, since:

$$R_B = R_A = Q_{AT} + S_A \quad [6]$$

(from [0] and [4]) and $$Q_{BT} + S_B = Q_{AT} + S_A \quad [6a]$$

(from [4] and [6]) and $$Q_{BT} + 1 = Q_{AT} + N_B/N_A \quad [6b]$$

(from [6a], [3] and $S_B = 1$), then $$Q_{AT} = Q_{BL} + 1 - N_B/N_A \quad [7]$$

(from [6b] and [5]), which allows calculation of $Q_{AT}$ directly, because $N_B/N_A$ and $Q_{BL}$ are known. In addition, because $S_B = 1$:

$$S_A = N_B/N_A \quad [8]$$

(from [3] above) and $$Q_{AL} = Q_{AT}/S_A \quad [9]$$

(from [4a]) (i.e., the length of the queue equals the time in queue divided by the service time), then:

$$Q_{AL} = Q_{AT} * N_A/N_B \quad [10]$$

(from [9] and [8]), which allows calculation of $Q_{AL}$ directly, using the known quantities of $Q_{AT}$, $N_A$, and $N_B$.

In sum, the average time in queue for configuration A, $Q_{AT}$, can be calculated from $Q_{BL}$ (the terminal queue length for configuration B), and from $N_B$ and $N_A$ (the number of users on both configurations at the end of ramp-up) as follows:

$$Q_{AT} = Q_{BL} + 1 - N_B/N_A \quad [7]$$

(from [6b] and [5]).
Once $Q_{AT}$ is known, the terminal queue length $Q_{AL}$ for configuration A can be calculated:

$$Q_{AL} = Q_{AT} * N_A/N_B \quad [10]$$

(from [9] and [8]).

Configuration of Target Configuration A, Based on $Q_{AL}$

Once the terminal queue length, $Q_{AL}$, is calculated 420, configuration A can be configured 430 to accommodate $N_A$ users of configuration A (assuming $R_{PA}$ equals $R_{PB}$). In particular, the throughput, $X_A$, necessary for the target configuration A can be determined and used to design a particular configuration capable of ensuring that the queue for subsystem configuration A does not exceed $Q_{AL}$. The exact calculation of $X_A$ is dependent on the subsystem being configured and the application at issue. Moreover, the particular implementation of a target configuration A is subject to a variety of design choices beyond the scope of the present invention. What follows, however, is an exemplary outline of preferred considerations for that process, where the target configuration is an I/O subsystem. One of skill in the art could adapt these methods and considerations to other subsystems, such as memory, networking, and CPUs.

1. Determine approximate number of I/O transactions/second needed.

Assume that some fraction of $N_A$ ($c/N_A$) requests an I/O transaction every second. By the "flow balance assumption" arrivals at a given resource equals completions at that resource for some period of time during the application. Otherwise, the subsystem will become astable. Therefore, if the arrival rate is c/sec, then the throughput for the I/O subsystem, $X_A$, also equals c/sec. Of course, the flow balance assumption is not always true, and when the arrival rate exceeds the completion rate for a subsystem, a queue begins to form. Accordingly, "c" is derived such that, when the flow balance assumption is violated, the queue at the I/O subsystem does not exceed $Q_{AL}$. The derivation of c cannot be simply quantified because it involves empirical knowledge of the application, particularly the so-called "think times" of the application, and the amount of time spent waiting for other system resources. However, one of skill in the art will recognize that for any given application, c can be derived from $Q_{AL}$. Because $X_A$ is defined as c/sec., $X_A$ can also, therefore, be determined for any given $Q_{AL}$.

2. Determine number of disk drives needed.

Knowing the throughput, $X_A$, required is c/sec, one next determines the number of disk drives required. Every disk drive "i" can handle a set number of disk accesses/second ($d_i$/sec). "Handling" a disk access means to process it without a queue forming either at the I/O interface level or within the disk sub-system. Importantly, $d_i$/sec is usually less than the drive manufacturer's rating. The algorithm for determining the number of necessary disk drives is simple and represented by the following pseudo-code:

temp=c
drives=0
while (temp>=0)
{
temp=temp−di
drives++
}

In other words, the number of disk drives equals c/di+1, except where c/di produces an integer, in which case the number of disk drives needed equals c/di.

3. Determine type of IF

Typically an interface card (IF) can deliver higher throughput than the number of drives attached to it can provide, so the IF card is rarely the bottleneck within an I/O subsystem. However, I/O throughput is affected by drive RAID (Redundant Array of Independent Disks) configurations as well. Various RAID configurations are possible to provide for data integrity via data redundancy. These RAID configurations increase I/O traffic in the IF, thereby reducing the overall throughput of the IF, and sometimes requiring the use of multiple IF cards where one would otherwise be required. In many cases there is also a limit to the number of drives that an IF can maintain based upon the RAID configuration and card type. Hence, the choice of IF and RAID level somewhat determines the number of disk drives needed to provide the necessary throughput, $X_A$.

4. Determine number of IF cards

Each interface card, IF, can handle (without a queue forming) a certain number of bytes/sec, denoted here as "t." From empirical data, the average size of disk accesses for the application of interest is generally known. Therefore, the number of IFs needed can be calculated via the following pseudo-code:

temp=c*average_size
interfaces=0
while (temp>=0)
{
temp=temp−t
interfaces++
}

As discussed, these are just some of the considerations that are necessary to design accurately an I/O configuration necessary to provide the appropriate throughput, $X_A$. Other considerations will be apparent to those skilled in the art.

Determine Throughput Factor to Resize Configuration A

Recall that $Q_{AL}$ and, therefore, $X_A$ were calculated assuming that $R_{PA}$ equals $R_{PB}$. If that assumption is not correct, and $R_{PA}$ is different from $R_{PB}$, configuration A should be resized to account for the different ramp-up period. In particular, it has been found that the queue length for a particular configuration increases as the ramp-up time decreases. In what follows, the maximum throughput of configuration A, $X_A$, is used to represent configuration A, itself.

Figure 5:
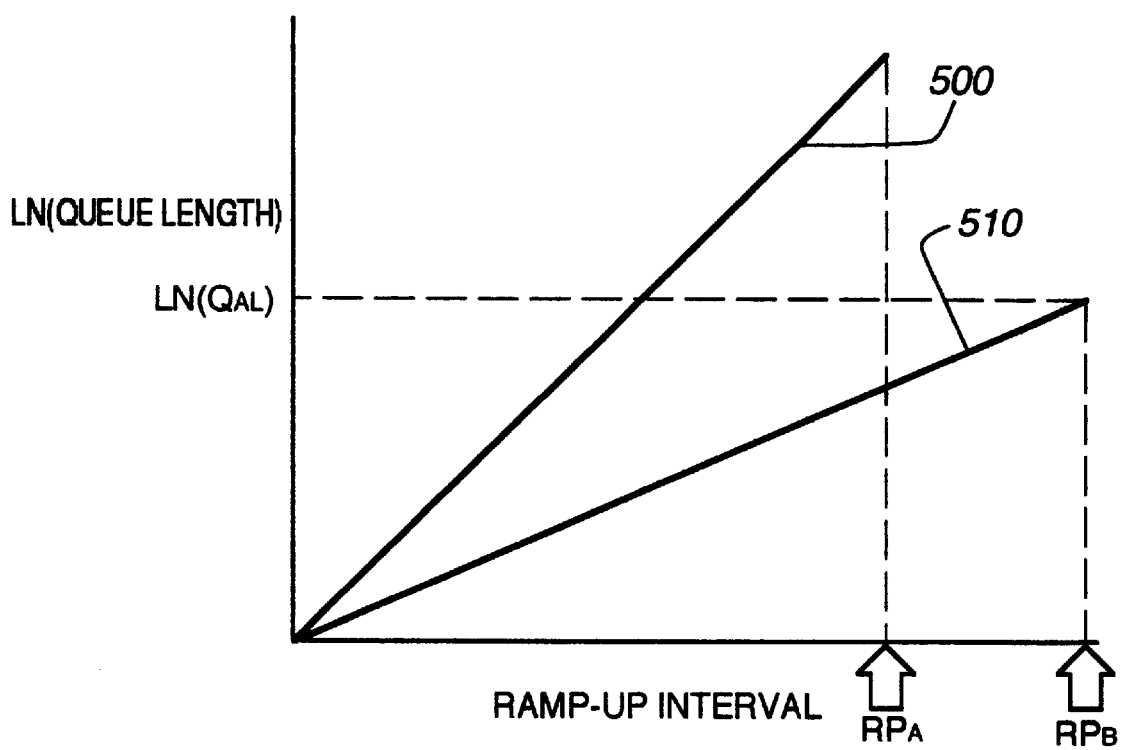
FIG. 5 is an exemplary graph illustrating the approximate change in the natural log of the queue length versus a change in ramp-up period duration of a particular I/O subsystem configuration running a particular application.

FIG. 5 illustrates that, for an exemplary I/O subsystem, the faster the ramp-up, the longer the resulting queue. In FIG. 5, the "queue length" depicted in logarithmic form on the y-axis is not necessarily the terminal queue length, it is simply the final queue length after ramp-up, regardless of whether the resulting response time is adequate or not. As shown by line 500 in FIG. 5, if $RP_A$ is shorter than $RP_B$, and no further adjustment to configuration A is made, the queue length for the subsystem will exceed $Q_{AL}$, resulting in unacceptable user response times. In extreme cases, the entire computer system could even become astable.

Figure 6:
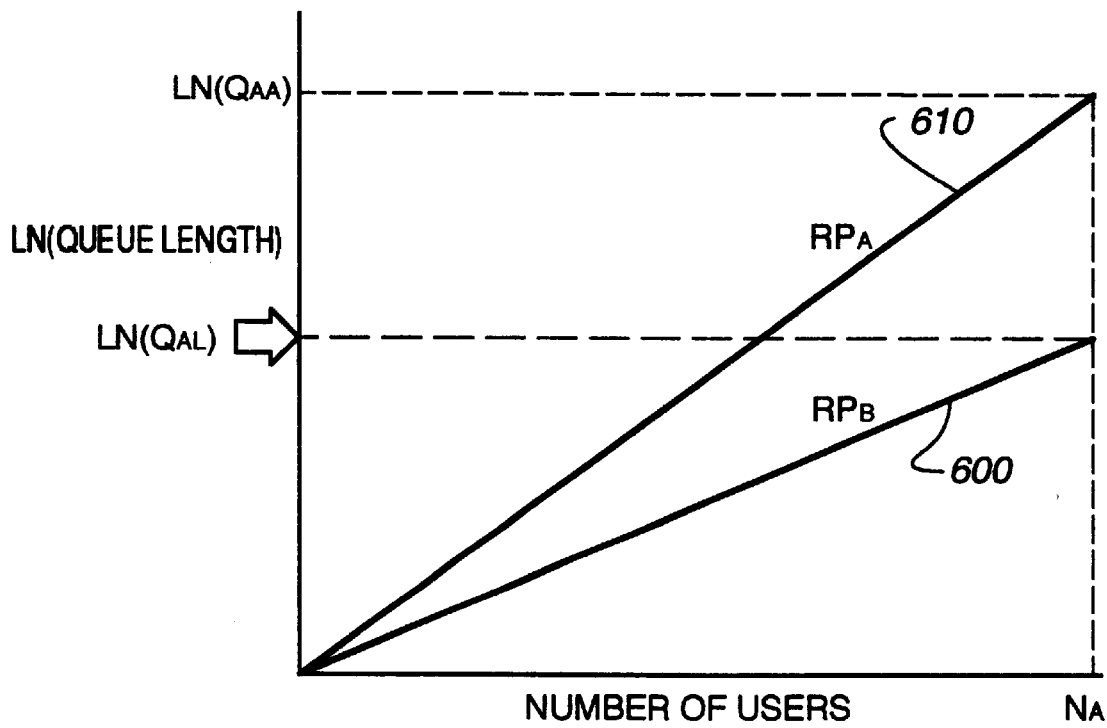
FIG. 6 is an exemplary graph illustrating the approximate change in the natural log of the queue length versus a change in number of users during the ramp-up period of a particular I/O subsystem configuration running a particular application.

FIG. 6 illustrates the same principle from a different perspective by plotting the increase in the number of users against the natural log of the resulting queue length. FIG. 6 again assumes that $RP_A$ is less than $RP_B$. As indicated by the difference in slopes between the two lines 600 and 610, subsystem queue length increases more rapidly for the shorter ramp-up period, $RP_A$, despite that the same number of users, $N_A$, are eventually added during ramp-up.

Since the maximum number of users is $N_A$, the slope of the line 600 for the $RP_B$ ramp-up is $$m_{AL}=LN(Q_{AL})/N_A. \qquad [11]$$

Actually, it has been found that only the second half of ramp-up needs to be modeled; the first half is unstable and violates the assumption that the utilization of the sub-system is 100% (i.e., $U_A=U_B=1$). Therefore, $$m_{AL}=LN(Q_{AL})/(N_A/2). \qquad [12]$$

In order to calculate the final queue length for the $RP_B$ ramp-up, however, the slope of line 610 is calculated. To state the problem more generally, for any ramp-up period $RP_i$ for configuration A, there is a slope $m_i$. There is, therefore, some function f, such that $$m_i=f(RP_i). \qquad [13]$$

It is assumed for these purposes that f is a linear function (because the increase in the subsystem queue is generally presumed to be exponential). Accordingly, $$m_i=c*RP_i \qquad [14]$$

where c is a constant. More precisely, $m_i$ is a function of users-added per minute (or other time quantum), so that $$m_i=k_A*N_A/RP_i. \qquad [15]$$

Because users-added/minute is given by $N_A/RP_i$, then:

$$k_A=m_{AL}*RP_B/N_A. \qquad [16]$$

In addition, because all the terms on the right side of equation [16] are known, $k_A$ can be calculated directly. With a known $k_A$, $m_i$ can be calculated directly via equation [15]. In other words, the slope of line 610, $m_{AA}$, can be calculated for any ramp-up period, $RP_A$ as follows:

$$m_{AA}=(m_{AL}*RP_B/N_A)*N_A/RP_A=m_{AL}*RP_B/RP_A.$$

Knowing the slope, $m_{AA}$, of line 610, it is simple to determine the final queue length, $Q_{AA}$, of configuration A for a given $RP_A$:

$$LN(Q_{AA})=m_{AA}*N_A/2 \qquad [17]$$

and $$Q_{AA} = \text{EXP}(m_{AA} * N_A/2) \quad [18]$$

Given both $Q_{AA}$ and $Q_{AL}$, one can derive a throughput factor, $T_F$, which facilitates re-scaling the configuration $X_A$ to account for the difference between $RP_A$ and $RP_B$. In particular:

$$T_F = Q_{AL}/Q_{AA} \quad [19]$$

such that $$Q_{AL} = Q_{AA} * T_F = \text{EXP}(m_{AA} * N_A/2) * T_F. \quad [20]$$

The new subsystem configuration, $X_A'$ is then given by:

$$X_A' = X_A/T_F. \quad [21]$$

In other words, $T_F$ is used to resize the configuration A (represented here by its throughput, $X_A$) to a new size $X_A'$ such that, in FIG. 6, the final queue lengths for both ramp-up intervals equal $Q_{AL}$. Doing so allows application-user response times to remain acceptable despite that RPA is shorter than $RP_B$.

Importantly, the response time for configuration $X_A'$ will not be exactly the same as the response time for configuration $X_A$. This is because when the throughput of a subsystem is increased, the subsystem is capable of completing more transactions per time quantum. Therefore, although the final queue lengths for both $X_A$ and $X_A'$ equal $Q_{AL}$, it will take configuration $X_A'$, with its increased throughput, less time than configuration $X_A$ to complete $Q_{AL}$ transactions. Stated another way, the terminal queue length for configuration $X_A'$ falls somewhere between $Q_{AL}$ and $Q_{AA}$, although it cannot be calculated directly.

Accordingly, where $RP_A$ is shorter than $RP_B$, the calculation of $X_A'$ recited above will result in a slightly oversized configuration A (because the queue length will never reach the actual terminal queue length for the resized configuration $X_A'$). Although this method is not exact, it is significantly more accurate than the "fudge factor" method. Moreover, it is preferable to err on the side of oversizing the subsystem. In the case of an I/O subsystem, for example, exceeding the terminal queue length can result in unacceptable user response times.

By the same token, however, where $RP_A$ is longer than $RP_B$, the calculation of $X_A'$ recited above will result in a slightly undersized configuration A. When the throughput of a subsystem is decreased, the subsystem is capable of completing fewer transactions per time quantum, thereby increasing the terminal queue length for the configuration. Accordingly, the final queue length may exceed the altered terminal queue length for the resized configuration $X_A'$. As discussed, although this undersizing may be slight, it is always preferable to err on the side of oversizing the subsystem. As such, it is preferred that the benchmark analysis of configuration B, discussed above, always include a ramp-up period, $RP_B$, that is greater than or equal to $RP_A$. In that manner, $X_A'$ will not be undersized.

In addition, some exceptional cases require practical limits and/or changes to the method of resizing set forth above. For instance, in some cases $T_F$ may be very small, which will result in impractically large subsystem configurations. If, for example, $T_F < 0.1$ for an I/O subsystem configuration, the customer may be asked to either reduce the number of users or increase the ramp-up period, $RP_A$.

Further, if $Q_{AL}$ is very small (e.g., $<=2.5$), the relationship between queue length and addition of users is presumed to be linear, and not exponential. There is no need to log-transform already-linear data. Accordingly, if the calculated terminal queue length, $Q_{AL}$, is below a preset threshold, the equations set forth above can be simplified. In particular:

$$m_{AL} = Q_{AL}/N_A$$

$$k_A = m_{AL} * RP_B/N_A$$

$$m_{AA} = k_A * N_A/RPA$$

$$Q_{AA} = m_{AA} * N_A$$

and $$T_F = Q_{AL}/Q_{AA}.$$

It is also recognized that resizing of a computer subsystem for a variable ramp-up period can be accomplished directly, without first calculating $Q_{AL}$, where the number of users in the target configuration $N_A$ equals the number of users in the benchmark analysis, $N_B$. In that instance, solving for $Q_{AL}$ is unnecessary, and $Q_{BL}$ can be substituted such that:

$$T_F = Q_{BL}/Q_{AA}$$

$T_F$ is then used to resize configuration B (represented as $X_B$) directly, such that:

$$X_B' = X_B/T_F.$$

Determine Whether any Other Subsystem Needs Resizing

Referring again to FIG. 4, once subsystem configuration A has been correctly sized for the application of interest, it is preferred that other subsystems are checked 460 to determine whether the resizing in subsystem configuration A has caused a different subsystem to become the system bottleneck. For example, if the throughput of the I/O subsystem is increased by steps 400–450 such that a different subsystem becomes the system bottleneck (or rate-limiting step), steps 400–450 should be repeated 470 for that new bottlenecking subsystem. Whether another subsystem has become the system bottleneck is determined empirically by monitoring (or modeling) the computer system, including the newly configured subsystem configuration A. Once all bottlenecking subsystems have been correctly sized, the overall computer system can be configured 480.

Figure 7:
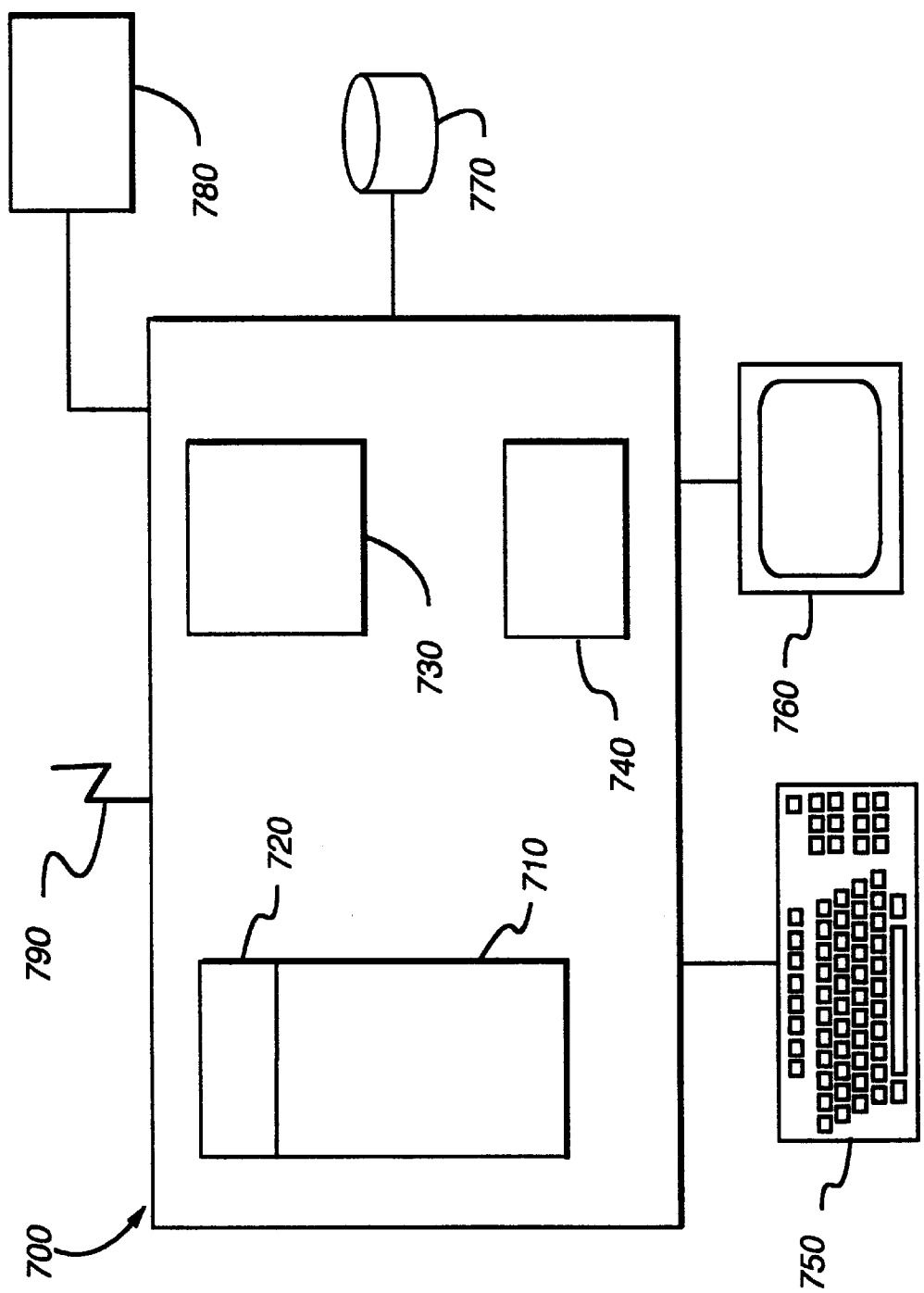
FIG. 7 is a block diagram of the apparatus of the present invention.

FIG. 7 is a block diagram of a computer system 700 that can be used to implement the methods embodying the present invention. The computer system 700 includes as its basic elements: a CPU 710 with associated cache memory 720, a main memory 730, and an I/O controller 740. The CPU 710, memory 730, and I/O controller 740 are all connected via a bus structure. The I/O controller 740 (which may comprise a combination of different I/O controllers) controls access to and information from external devices such as a keyboard 750, a monitor 760, permanent storage 770, and removable media unit 780. In addition, the computer system 700 may be connected through a network connection 790 to other computer systems.

It should be understood that FIG. 7 is a block diagram illustrating the basic elements of a computer system. This figure is not intended to illustrate a specific architecture for the computer system 700 of the present invention. For example, no particular bus structure is shown because various bus structures, and combinations of bus structures, known in the field of computer design may be used to interconnect the elements of the computer system 700 in a number of ways, as desired. The CPU 710 may be comprised of a discrete arithmetic logic unit (ALU), registers, and control unit or may be a single device in which these parts of the CPU 710 are integrated together, such as in a microprocessor. Moreover, the number and arrangement of the elements of the computer system 700 may be varied from what is shown and described in ways known in the art (i.e., multiple CPUs, client server systems, computer networks, etc.)

Some or all of the method steps described in relation to FIGS. 2–6 can be, but need not be, accomplished via computer system 700. In particular, a program for controlling CPU 710 to perform those method steps can be stored in any of the storage devices 730, 770, or 780, or may be accessed from another storage device and/or CPU via network connection 790 (such as a computer program hosted on an internet web site).

It will be recognized by those skilled in the art that the methods and apparatus of the present invention can be altered from those particularly described herein without departing from the scope of the present invention. For example, $Q_{AL}$ can be utilized without being calculated directly, such as by utilizing some function of $Q_{AL}$ in its place. In addition, it should be recognized that the present invention can be used with minor modifications to size subsystem configurations for variable ramp-down periods as well. Accordingly, the scope of the present invention should not be limited except by the appended claims.

We claim:

1. A method for sizing a computer system for a particular application, wherein peak utilization of certain subsystems within the computer system may occur during ramp-up, comprising the following steps:

obtaining empirically derived diagnostic data for a known configuration, B, of a computer subsystem, the configuration B accommodating a number of users, $N_B$, and a ramp-up period, $RP_B$;

calculating, based on the diagnostic data for known configuration, B, a throughput for target configuration, A, of the computer subsystem, the target configuration A accommodating a number of users, $N_A$, and a ramp-up period, $RP_A$, and wherein the throughput provides an acceptable application-user response time during the $RP_A$; and configuring the target configuration A.

2. The method of claim 1, wherein the empirically derived diagnostic data for known configuration B includes a terminal queue length, $Q_{BL}$.

3. The method of claim 1, wherein the target configuration A forms a queue of variable length and wherein the step of calculating includes determining a terminal queue length, $Q_{AL}$, for the target configuration A, and the step of configuring includes designing the configuration A based on at least the $Q_{AL}$.

4. The method of claim 1, wherein the $N_A$ is different from the $N_B$.

5. The method of claim 1, wherein the $R_{PA}$ is different from the $RP_B$.

6. The method of claim 3, wherein the step of calculating comprises determining the throughput for the target configuration A to prevent the queue length of the configuration A from exceeding the $Q_{AL}$ during the ramp-up period $RP_A$.

7. The method of claim 3, wherein the $RP_A$ is different from the $RP_B$, and wherein the step of calculating comprises:

calculating the throughput for the configuration A to prevent the queue length of the configuration A from exceeding the $Q_{AL}$, assuming that the $RP_A$ is equal to the $RP_B$;

calculating a final queue length, $Q_{AA}$, for the configuration A during the ramp-up period, $RP_A$; and calculating, based on a ratio of the $Q_{AL}$ and the $Q_{AA}$, a throughput factor, $T_F$, to resize the throughput for the configuration A to prevent the queue length of the configuration A from exceeding the $Q_{AL}$.

8. The method of claim 5, wherein the empirically derived diagnostic data for known configuration B includes a terminal queue length, $Q_{BL}$, and wherein the step of calculating includes:

calculating a final queue length, $Q_{AA}$, for the configuration A during the ramp-up period, $RP_A$; and calculating a throughput factor, $T_F$, based at least on a ratio of the $Q_{BL}$ and the $Q_{AA}$.

9. The method of claim 8, wherein the step of configuring includes resizing the configuration B based on $T_F$.

10. The method of claim 1, wherein the computer subsystem is an input/output system.

11. The method of claim 1, further comprising the steps of:

obtaining empirically derived diagnostic data for a known configuration, D, of a second computer subsystem, the configuration D accommodating a number of users, $N_D$, and a ramp-up period, $RP_D$;

calculating, based on the diagnostic data for known configuration, D, a throughput for target configuration, C, of the second computer subsystem, the target configuration C accommodating a number of users, $N_C$, and a ramp-up period, $RP_C$, and wherein the throughput provides an acceptable application-user response time during the $RP_C$;

configuring the target configuration C; and configuring the computer system, including incorporating at least the target configuration A and the target configuration C.

12. A method for sizing a computer system for a particular application, wherein peak utilization of certain subsystems within the computer system may occur during ramp-up, comprising the following steps:

obtaining an empirically derived terminal queue length, $Q_{BL}$ for a known configuration, B, of a computer subsystem, the configuration B accommodating a number of users, $N_B$, and a ramp-up period, $RP_B$;

determining, based at least on the $Q_{BL}$, a throughput for target configuration, A, of the computer subsystem, the target configuration A accommodating a number of users, $N_A$, and a ramp-up period, $RP_A$, and wherein the throughput provides an acceptable application-user response time during the $RP_A$; and configuring the target configuration, A.

13. The method of claim 12, wherein the $N_A$ is different from the $N_B$.

14. The method of claim 12, wherein the $RP_A$ is different from the $RP_B$.

15. The method of claim 12, wherein the target configuration A forms a queue of variable length, and wherein the step of determining comprises determining the throughput for the target configuration A to prevent the queue length of the configuration A from exceeding the $Q_{AL}$ during the ramp-up period $RP_A$.

16. The method of claim 14, wherein the target configuration A forms a queue of variable length, and wherein the step of determining comprises determining the throughput for the configuration A to prevent the queue length of the configuration A from exceeding the $Q_{AL}$ during the ramp-up period $RP_A$.

17. The method of claim 14, wherein the target configuration A forms a queue of variable length, and wherein the step of determining comprises:

calculating the throughput for the configuration A to prevent the queue length of the configuration A from exceeding the $Q_{AL}$, assuming that the $RP_A$ is equal to the $RP_B$;

calculating a final queue length, $Q_{AA}$, for the configuration A during the ramp-up period, $RP_A$; and calculating, based on a ratio of the $Q_{AL}$ and the $Q_{AA}$, a throughput factor, $T_F$, to resize the throughput for the configuration A to prevent the queue length of the configuration A from exceeding the $Q_{AL}$.

18. An apparatus for sizing a computer system for a particular application, wherein peak utilization of certain subsystems within the computer system may occur during ramp-up, comprising:

a storage device;

a processor operatively connected to the storage device;

the storage device:

storing a program for controlling the processor; and receiving empirically derived diagnostic data for a known configuration, B, of a computer subsystem, the configuration B accommodating a number of users, $N_B$, and a ramp-up period, $RP_B$; and the processor operative with the program to:

calculate, based on the diagnostic data for known configuration, B, a throughput for target configuration, A, of the computer subsystem, the target configuration A accommodating a number of users, $N_A$, and a ramp-up period, $RP_A$, and wherein the throughput provides an acceptable application-user response time during the $RP_A$; and configure the target configuration A.

19. The apparatus of claim 18, wherein the empirically derived diagnostic data for known configuration B includes a terminal queue length, $Q_{BL}$.

20. The apparatus of claim 19, wherein the processor is operative with the program to determine a terminal queue length, $Q_{AL}$, for the target configuration A, and to design the configuration A based on at least the $Q_{AL}$.

* * * * *